（12）United States Patent
Adams

(10) Patent No.: US 7,400,359 B1
(45) Date of Patent: Jul. 15, 2008

(54) VIDEO STREAM ROUTING AND FORMAT CONVERSION UNIT WITH AUDIO DELAY

(75) Inventor: Dale R. Adams, San Jose, CA (US)

(73) Assignee: Anchor Bay Technologies, Inc., Los Gatos, CA (US)

( * ) Notice: Subject to any disclaimer, the term of this patent is extended or adjusted under 35 U.S.C. 154(b) by 1107 days.

(21) Appl. No.: 10/753,909

(22) Filed: Jan. 7, 2004

(51) Int. Cl.
*H04N 7/01* (2006.01)
*H04N 11/20* (2006.01)
*H04N 5/268* (2006.01)

(52) U.S. Cl. .................. 348/441; 348/705; 348/554; 348/448

(58) Field of Classification Search .............. 348/705, 348/706, 441, 448, 459, 561, 562, 581, 582, 348/659–661, 584, 554, 555, 722; 715/722; *H04N 7/01, H04N 11/20, 5/268, 9/74, 3/27, 5/46, 5/222*
See application file for complete search history.

(56) References Cited

U.S. PATENT DOCUMENTS

| | | | |
|---|---|---|---|
| 4,997,321 A | 3/1991 | Adams | |
| 5,357,606 A | 10/1994 | Adams | |
| 5,857,118 A | 1/1999 | Adams et al. | |
| 6,219,747 B1 | 4/2001 | Banks et al. | |
| 6,380,978 B1 | 4/2002 | Adams et al. | |
| 6,385,692 B2 | 5/2002 | Banks et al. | |
| 6,393,505 B1 | 5/2002 | Scalise et al. | |
| 6,473,476 B1 | 10/2002 | Banks | |
| 6,489,998 B1 | 12/2002 | Thompson et al. | |
| 6,515,706 B1 | 2/2003 | Thompson et al. | |
| 6,587,158 B1 | 7/2003 | Adams et al. | |
| 6,681,059 B1 | 1/2004 | Thompson | |
| 6,700,622 B2 | 3/2004 | Adams et al. | |
| 7,089,577 B1 * | 8/2006 | Rakib et al. ................. 725/87 |
| 7,206,025 B2 * | 4/2007 | Choi ........................ 348/441 |
| 7,236,209 B2 * | 6/2007 | Martin ..................... 348/554 |

OTHER PUBLICATIONS

Adams, D., U.S. Appl. No. 10/753,909, entitled, "Video Stream Routing & Format Conversion Unite With Audio Delay", filed Jan. 7, 2004, Background pp. 2-9.

* cited by examiner

*Primary Examiner*—Sherrie Hsia
(74) *Attorney, Agent, or Firm*—Perkins Coie, LLP

(57) ABSTRACT

An apparatus capable of establishing different video sample stream processing channels between a plurality of video sample stream inputs and a video sample stream output is described. The apparatus includes a multi-state routing network comprising wiring to route a video sample stream. The multi-state routing network comprises outputs that are coupled to the inputs of a plurality of video sample stream channel processing segments, where, each channel processing segment comprises at least one signal processing block. The multi-state routing network also comprises inputs that are coupled to the outputs of the video sample stream channel processing segments. The multi-state routing network also comprises the plurality of video sample stream inputs the video sample stream output.

25 Claims, 9 Drawing Sheets

MODE 1 (MUX1 = A; MUX2 = MUX3 = X)

RGB$_{IN}$ ⟶ OUT

MODE 2 (MUX1 = B, MUX2 = A, MUX3 = B)

MODE 3 (MUX1 = B, MUX2 = X, MUX3 = A)

MODE 4 (MUX1 = B, MUX2 = B, MUX3 = B)

MODE 5 (MUX1 = B, MUX2 = X, MUX3 = C)

VIDEO STREAM ROUTING AND FORMAT CONVERSION UNIT WITH AUDIO DELAY

FIELD OF INVENTION

The field of invention relates generally to signal processing; and, more specifically, digital video stream routing and format conversion unit with audio delay.

BACKGROUND

FIG. 1 shows a system for viewing digital video while listening to its corresponding audio. The system includes a digital video display 104 and one or more speakers 102. The digital video display 104 is driven by display driving circuitry 103; and, the one or more speakers 102 are driven by speaker driving circuitry 101. The display driving circuitry 103 receives a stream of video "samples" and renders them onto the display 104. The speaker driving circuitry 101 receives a stream of audio samples and causes the speaker(s) 102 to produce corresponding audio sounds. The term "samples" is a historical term that refers to the digital capture of video/audio information from its naturally analog form. The term samples should nevertheless be understood to also refer to video and/or audio information having a non-analog source (e.g., computer graphics, digitally synthesized music, etc.).

FIGS. 2a through 2c relate to differing aspects of the manner in which a video sample stream may be formatted. Specifically, FIG. 2a relates to different ways in which a video sample may be encoded; FIG. 2b relates to different ways in which the video samples may be ordered within the video sample stream; and, FIG. 2c relates to differing amounts of video samples that may exist in the video sample stream per rendered horizontal line of displayed imagery and per rendered vertical line of displayed imagery.

FIG. 2a shows three different video sample encoding formats 201, 202, 203. Each of the video sample steams 201, 202, 203 show their corresponding encoding approach across seven samples 200 (S1 through S7). Video sample stream 201 corresponds to a "trichromatic" encoding approach. Both of video sample streams 202 and 203 correspond to "color difference" encoding approaches.

According to a "trichromatic" encoding approach, each video sample contains three color components where the mixing of any two color components cannot produce the third color component. Video sample stream 201 provides an example of the most commonly used trichromatic approach "RGB". RGB breaks down each sample into red (R), green (G) and blue (B) components. Thus, the first sample S1 in video sample stream 201 corresponds to the red, green and blue components ($R_1 G_1 B_1$) of the first sample's visual information, the second sample S2 in video sample stream 202 corresponds to the red, green and blue components ($R_2 G_2 B_2$) of the second sample of visual information, etc.

Both of video sample streams 202 and 203 employ a "color difference" encoding scheme. Color difference schemes use a luminance related quantity called luma (e.g., Y) and a pair of color difference components called chroma (e.g., $C_b, C_r$). Color difference schemes are often characterized by the sample rate relationship as between the luma and chroma components. According to a first type, referred to as 4:4:4, the luma and chroma components have the same sample rate. Thus, as seen in the 4:4:4 color difference sample stream 202, both luma and chroma components exist for each sample in the sample stream. According to a second type, referred to as 4:2:2, the chroma components have half the sample rate as the luma component. Thus, as seen in the 4:2:2 color difference sample stream 203, each sample has a luma component but only every other sample has chroma components.

FIG. 2b relates to different ways in which the video samples may be ordered within the video sample stream. A first is referred to as "progressive" and a second is referred to as "interlaced". According to a "progressive" approach the samples within a video sample stream are ordered so that each of the frames of the video, when presented on the display, correspond to a complete "full screen" picture. FIG. 2b attempts to depict a progressive display approach by showing a series of frames 210 through 213 each having a complete set of horizintal "scan" lines of displayed samples.

By contrast, according to an interlaced approach, the samples within a video stream are ordered so that the frames of the video are presented on the display as a pair consecutive "fields" where each neighboring horizontal "scan" line in a field corresponds to every other horizontal "scan" line on the display. FIG. 2b attempts to depict an interlaced display approach by showing a sequence of fields 214, 215, 216 and 217, where fields 214 and 216 are located only on even numbered scan lines, and fields 215 and 217 are located only on odd numbered scan lines.

FIG. 2c demonstrates that different video sample streams may have different amounts of video samples per rendered horizontal line of displayed imagery and per rendered vertical line of displayed imagery. The samples, or picture elements in this rectangular array are commonly referred to as "pixels". Here, the video sample stream should be formatted so that its samples correspond to (or at least can be rendered upon) the display upon which they are to be shown. Many video display types are designed to render imagery across an arrangement of pixels. The arrangement of pixels is typically characterized as the number of pixels that extend horizontally across the display and the number of pixels that extent vertically across the display.

FIG. 2c shows a representation of the pixel layout for two different video displays 218, 219. The first video display 218 has a pixel layout of 480 vertical pixels by 640 horizontal pixels. The second video display 219 has a pixel layout of 1080 vertical pixels by 1920 horizontal pixels. Note that different aspect ratios can be achieved based upon the pixel layout. That is, the first video display has a 4:3 horizontal to vertical aspect ratio (i.e., 640/480=4/3) that is typical of standard television; and, the second video display has a 16:9 horizontal to vertical aspect ratio (i.e., 1920/1080=16/9) that is more typical of standard cinema.

Because a display's pixel layout can be viewed as an array, a display can be viewed as having Y number of horizontal lines that each have X pixels; where, Y is the vertical pixel count and X is the horizontal pixel count (i.e., display 218 can be viewed as having 480 horizontal lines that each have 640 pixels; and, display 219 can be viewed as having 1080 horizontal lines that each have 1920 pixels). Here, referring briefly back to FIG. 1, for a video sample stream that is provided to a display's driving circuitry 103, the number of samples per horizontal line in the sample stream ideally correspond to the number of pixels per horizontal line in the display 104; and, the number of horizontal lines' worth of samples per frame in the sample stream ideally corresponds to the vertical pixel count of the display 104.

Because of the various ways in which a video sample stream may be formatted, specific signal processing blocks have been used to convert from one type of formatting to another type of formatting. FIGS. 3a through 3d demonstrate some of these signal processing blocks.

FIG. 3a shows a color space converter 301 (CSC). The color space converter 301 is responsible for converting from one type of sample encoding to another type of sample encoding. For example, color space converter 301 might convert trichromatic encoded samples into color difference encoded samples; or, color space conveter CSC could covert color difference encoded samples into trichromatic encoded samples. FIG. 3b shows a pair of converters 302, 303 for converting between different forms of color difference conversion. Specifically, converter 302 converts 4:4:4 color difference encoded samples into 4:2:2 encoded samples; and, converter 303 converts 4:2:2 color difference encoded samples into 4:4:4 encoded samples.

FIG. 3c shows a deinterlacer 304. Deinterlacer 304 converts an interlaced video sample stream into a progressive video sample stream. Various types of deinterlacing schemes exist. A basic approach involves simply packing the content of a pair of consecutive fields into a single progressive frame. However, this approach can render noticeable defects for fast motion images if neighboring fields correspond to different moments of time (i.e., an object of fast motion will blur). As such, "motion adaptive" deinterlacers have been developed that intelligently calculate the missing content between neighboring field lines in order to produce a complete progressive frame.

Another type of deinterlacing technique, referred to as "inverse 2-3 pulldown", effectively reverses a "2-3 pulldown" interlacing process. The 2-3 pulldown process converts frames from a 24 frame per second stream into a 2-3-2-3-... field pattern (e.g., a first frame is used to create a pair of fields, the next frame is used to create a trio of fields, etc.) so as to create a 60 field per second stream. Inverse 2-3 pulldown combines fields from the same original film frame to form a complete video frame. Because fields are combined by this process so as to create frames, "inverse 2-3 pulldown" is viewed as a deinterlacing technique. Another type of deinterlacing technique, referred to as "inverse 2-2 pulldown", effectively reverses a "2-2 pulldown" technique that uses each frame to create a pair of fields.

FIG. 3d shows a frame rate converter. A frame rate converter changes the formatting of a sample stream from being compatible with a first frame rate (e.g., 60 frames per second (fps)) to being compatible with a second frame rate (e.g., 30 frames per second (fps)). Frame rate converters are typically constructed to provide an output stream that, when viewed, exhibits rendered images having the same speed of motion that the input stream exhibits at its corresponding frame rate. That is, typically, the frame rate conversion process is not supposed to change the speed at which moving images move when displayed. A frame rate converter typically accepts input information that informs the frame rate converter of the specific conversion that it is to take place (e.g., a specific rate upconversion or rate downconversion)

FIG. 3e shows a scaler 306. A scaler converts a video sample stream that is formatted for a first pixel array into a sample stream that is formatted for a second pixel array. For example, referring also to FIG. 2c, a scaler 305 would be used to convert a sample stream that is formatted for the 1920× 1080 display 219 into a sample stream that is formatted for the 640×480 display 218 (e.g., by intelligently "dropping" certain samples). Likewise, a scaler 305 could also be used to covert a video sample stream that is formatted for the 640× 480 display 218 into a sample stream that is formatted for the 1920×1080 display (e.g., by determining appropriate pixel spacings between those pixels that will be illuminated with sample data from the 640×480 compatible stream). Other than dropping pixels (when scaling from a higher pixel density display to a lower pixel density display) or repeating pixels (when scaling from a lower density pixel display to a higher pixel density display), more advanced methods such as finite impulse response (FIR) filtering or linear interpolation may be used. A scaler typically accepts some form of input information (e.g., a scale factor) that informs the scaler of the specific scaling that it is to perform.

Note that any of the signal processing blocks of FIGS. 3a through 3e may be implemented in whole or in part with dedicated hardware (e.g., CMOS circuitry or programmable logic designed to perform the signal processing functions) or in software (e.g., a general purpose or digital signal processor that executes instructions to perform the signal processing functions).

FIGURES

The present invention is illustrated by way of example and not limitation in the figures of the accompanying drawings.

DETAILED DESCRIPTION

Figure 4:
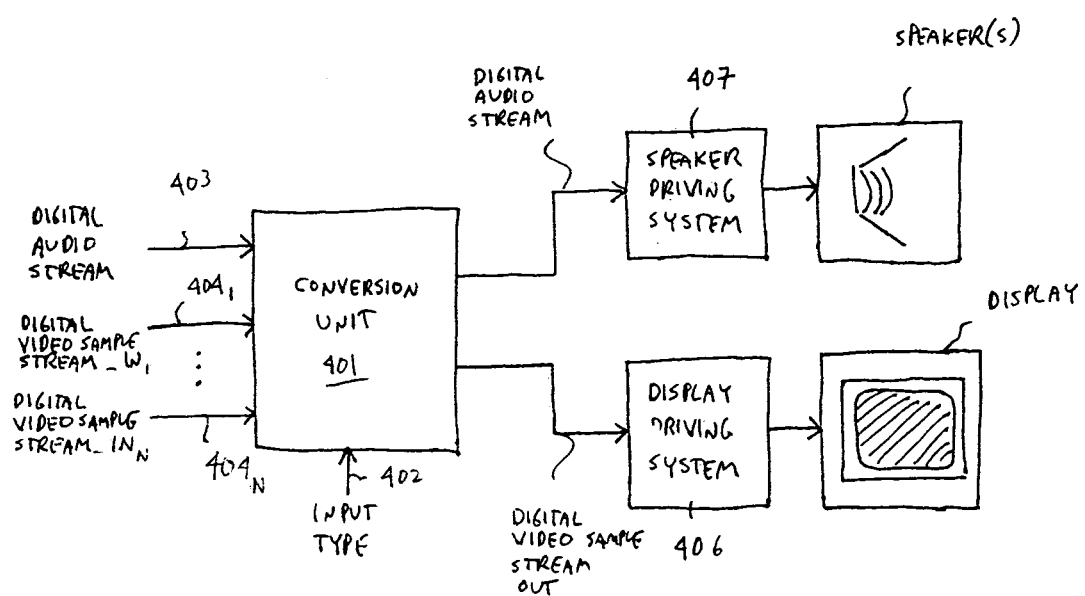
FIG. 4 shows an audio/video presentation system that can receive and process differently formatted video sample streams.

FIG. 4 shows a system for viewing digital video while listening to its corresponding audio, where, even though the display driving circuitry 406 expects a specific type of video sample stream format, video sample streams of various types of formats may nevertheless be accepted and displayed on the video display. According to the approach of FIG. 4, a sample stream conversion unit 401 is positioned before the display driving circuitry 406. The sample stream conversion unit 401 is capable of accepting a video sample stream that has been formatted according to any of a plurality of different formatting approaches; and, "reformats" the video sample stream to the format that is expected by the display driving circuitry 406.

According to the embodiment of FIG. 4, the sample stream conversion unit has up to N video sample inputs $404_1$ through $404_N$. Here, for example, each video input may be designed to handle samples streams that have some formatting difference with respect to sample streams received at other video inputs.

As an example of such an approach, for an N=2 conversion unit, a first input (e.g., $404_1$) could be used for receiving video sample streams that are encoded according to a trichromatic encoding scheme; and, a second video input (e.g., $404_{N=2}$) could be used for receiving video sample streams that have been encoded according to a color difference encoding scheme. Control information is accepted at an input 402 that identifies, at least to some degree, the formatting of the input video sample stream to be re-formatted. According to various further embodiments a full characterization of the input video sample stream is not provided because certain formatting characteristics can be determined automatically within the conversion unit 401.

The conversion unit 401 also accepts a video sample stream's corresponding audio sample stream at another input 403; and, provides the audio sample stream to the speaker driving circuitry 407 after applying some delay that accounts for the delay imposed upon the video sample stream by the conversion unit's video sample reformatting activity.

Figure 5:
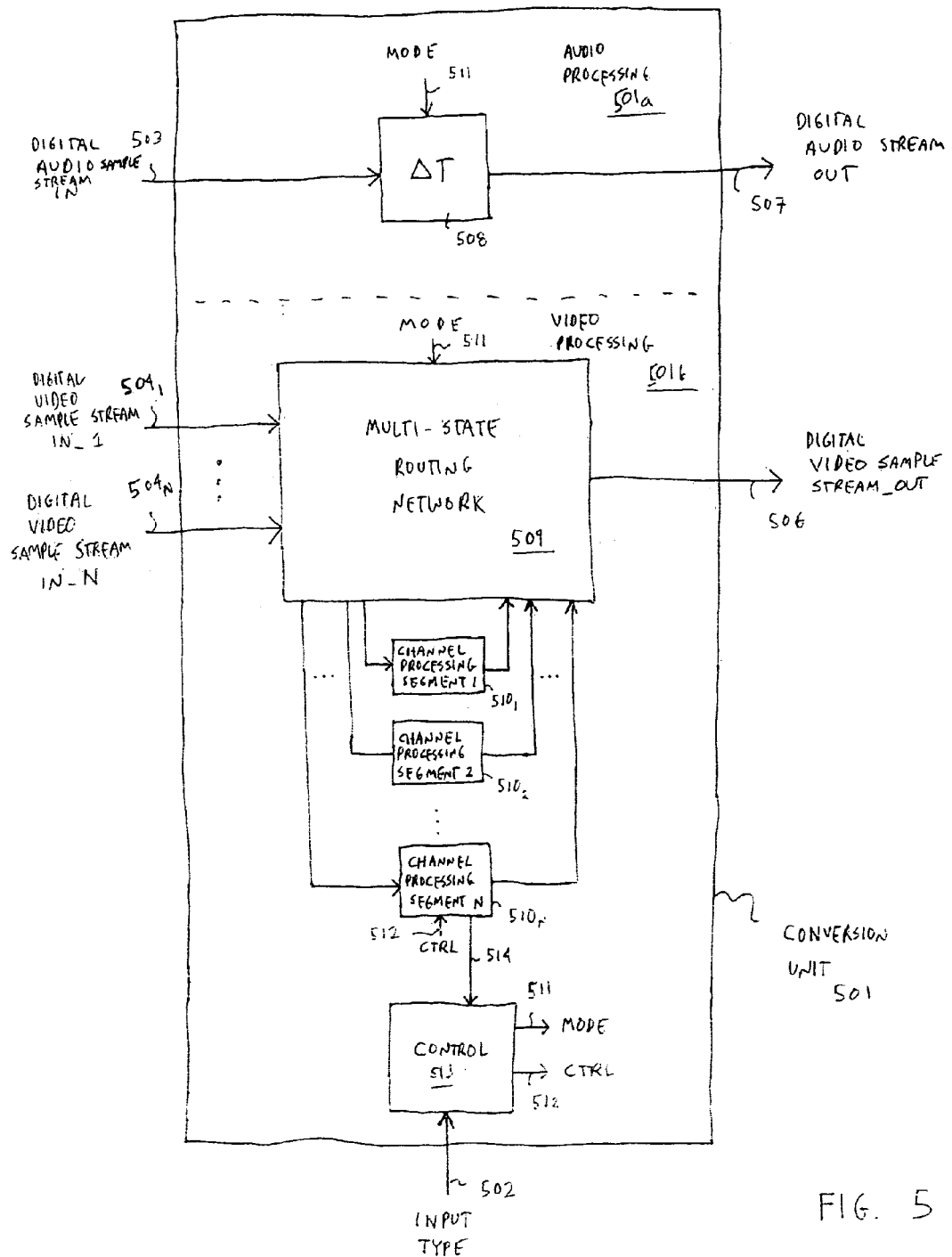
FIG. 5 shows an architecture for the sample stream conversion unit of FIG. 4.

FIG. 5 shows an architecture 501 for the conversion unit 401 of FIG. 4. The architecture shows both an audio side 501a and a video side 501b. The audio side 501a, as discussed above, applies a delay that is imposed by a delay unit 508. The delay unit 508 typically comprises memory space that temporarily holds each audio sample for an amount of time that is consistent with the amount of delay to be applied to each audio sample. The amount of delay, as discussed, is a function of the reformatting that is applied to the video sample stream. More discussion regarding the treatment of audio samples is provided toward the end of this detailed description.

The video processing side 501b includes a multi-state routing network 509 that is able to accept differently formatted digital video sample streams across inputs $504_1$ through $504_N$ and provides an output digital video stream at output 506. The multi-state routing network 509 also sends/receives video sample streams to/from a number of channel processing segments $510_1$ through $510_N$. Each channel processing segment performs one or more specific signal processing tasks upon a video sample stream so as to contribute to its reformatting. Because different video sample stream formats can be accepted and reformatted by the conversion unit 501, it is expected that not all of the channel processing segments $510_1$ through $510_N$ would be used to reformat many of the different video sample stream formats that could be received. Better said, for example, a first type of received video sample stream format might only need one of the channel processing segments in order to be properly reformatted, a second type of received video sample stream format might need two of the channel processing segments in order to be properly reformatted, a third type of received video sample stream format might need three of the channel processing segments in order to be properly reformatted, etc. The multi-state routing network 509 has routed wiring to interconnect: 1) the video sample stream input nodes 504, 505 to appropriate channel processing segment input nodes; 2) appropriate channel processing segment output nodes to appropriate channel processing segment input nodes; and, 3) appropriate channel processing segment output nodes to the conversion unit video sample stream output 506.

The term "appropriate" as used above can be construed to mean "whatever might be needed to properly reformat a received video sample stream". Said another way, the video processing side 501b can be viewed as being capable of establishing a number of different signal processing channels for each video sample stream input 504, 505. The multi-state routing network 509 is capable of establishing any of these signal processing channels by establishing the correct connections as between a video sample stream input, the one or more channel processing segments, and the conversion unit video sample output 506. Each set of connections that correspond to a specific reformatting channel for a particular input can be referred to as a unique "state" of the mult-state routing network 509 that it is capable of being configured into. A specific embodiment of a multi-state routing network is discussed further below with respect to FIGS. 6 and 7a through 7e.

The conversion unit 501 also includes some form of control function 513 that understands the specific type of video sample stream formatting that is to be applied to the input video sample stream; and, in response, signals the multi-state routing network 509 to place it into the appropriate state. FIG. 5 shows a mode output 511 of the control function 513 being applied to the multi-state routing network 509 for this purpose, as well as being applied to the audio delay unit 508 to influence the amount of delay added to the audio stream. The control function 513 may also be configured to send control information to a channel processing segment. That is, beyond being selected for participation in the reformatting process of a particular input video sample stream, it is possible for a channel processing segment to require some form of additional control information in order to properly participate in the reformatting process. For example, in order to perform the correct scaling, a scaler block within a channel processing segment may need to be told the pixel dimensions that the input video sample stream has been formatted for. Channel processing segment control input 512 corresponds to an input that can receive control information such as that described just above. Which channel processing unit(s) accept some form of control information may vary from embodiment to embodiment. The control input 512 may take on various forms such as dedicated control lines; or, a bus that is capable of transporting other transactions besides mode input 511 information.

The control function 513 may be implemented with a processor or microcontroller that executes software routines in order to set the multi-state routing network's state. Alternatively, a state machine circuit may be used. The manner in which the mode input 511 may be provided from the control function 513 to the multi-state routing network 509 may take on various forms such as dedicated control lines; or, a bus that is capable of transporting other transactions besides mode input 511 information. Note that one or more channel processing segments may also need to be provided with control information that signifies what type of processing is to be performed. For example, a deinterlacer function within a channel processing segment may be enabled or disabled with respect to the segment's overall processing in light of the digital video sample stream to be formatted.

Also, one or more components within the channel processing segments may be designed to "detect" the type of formatting that a received input video sample stream possesses and report this information to the control function (e.g., so that the control function can determine what type of mutli-state routing network 509 state is to be effected). Reporting control line 514 can be viewed as an embodiment of a line for reporting such information to the control function 513.

Figure 6:
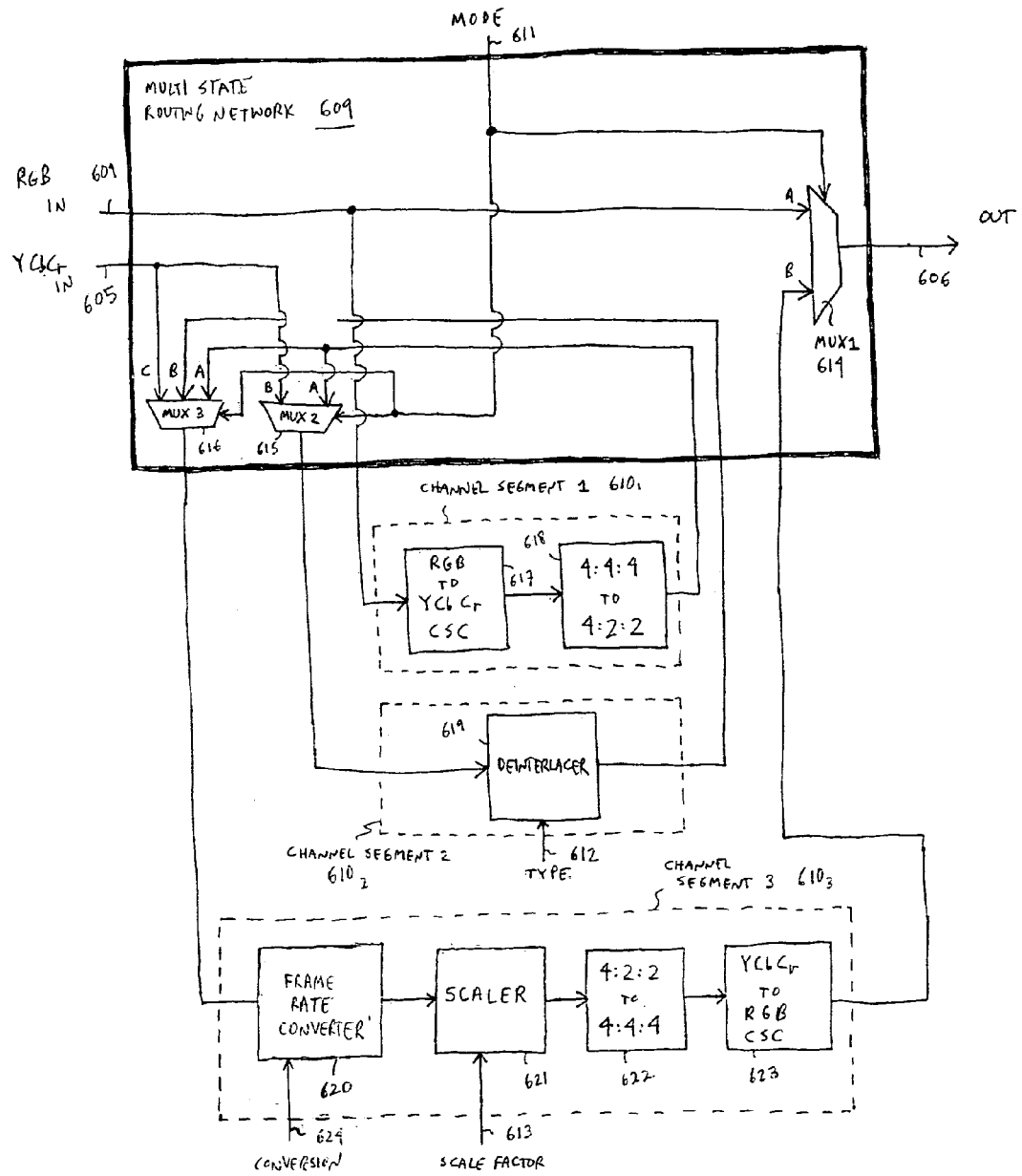
FIG. 6 shows an embodiment of a sample stream conversion unit that conforms to the video portion of the architecture of FIG. 5.

FIG. 6 shows a more detailed embodiment of the video side of a conversion unit that is capable of accepting either RGB or color difference encoded video sample streams that are either interlaced or progressive and that have any pixel arrangement from a wide variety of pixel arrangements. The depicted video side of a conversion unit can then reformat any of the above described video sample streams into an RGB, progressive video sample stream formatted for a display having any of a number of different pixel arrangements. When installed in a complete system (such as that originally shown in FIG. 4), the complete system's display will likely have a fixed pixel array. Thus, when installed in a complete system having a single display, the output video sample stream that is provided at output 606 is expected to be formatted for the pixel array of the single display.

The multi-state routing network 609 includes routed wiring for making the appropriate interconnections as a function of the state of mode input 611. The multi-state routing network 609 may be implemented with logic circuitry. The precise functioning of the multi-state routing network 609 of FIG. 6 will be described in more detail with respect to FIGS. 7a through 7e. Three channel processing segments 610₁ through 610₃ are shown in FIG. 6. A first channel processing segment 610₁ includes an RGB to color difference (YCbCr) color space converter 617 coupled in series with a 4:4:4 to 4:2:2 color difference converter 618. A second channel processing segment 610₂ includes only a deinterlacer 619. A third channel processing segment 610₃ includes a frame rate converter 620 that is coupled in series with a scaler 621 that, in turn, is coupled in series to a 4:2:2 to 4:4:4 color difference conversion unit 622 which is then coupled in series to a YCbCr to RGB color space converter 623.

Figure 7A:
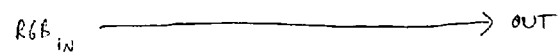
FIGS. 7a through 7e show different video sample stream processing channels that can be effected by the sample stream conversion unit depicted in FIG. 6.

FIGS. 7a through 7e show the different signal processing channels that the multi-state routing network 609 of FIG. 6 is capable of establishing with the channel processing segments 610₁ through 610₃ to which it is coupled. Note that the multi-state network has a first input 604 where RGB encoded samples are received and a second input where color difference encoded samples are received. The first channel of FIG. 7a corresponds to a "straight through" from the RGB input 604 to the conversion unit video sample output 606. As such, the channel of FIG. 7a is used in a situation when the input sample stream is already formatted in a manner that is appropriate for the output sample stream. With the output 606 being designed to provide RGB encoded samples, no re-encoding is required. Moreover, no deinterlacing or scaling is performed. The channel of FIG. 7a is realized by configuring multiplexer 614 to select channel A.

Figure 1:
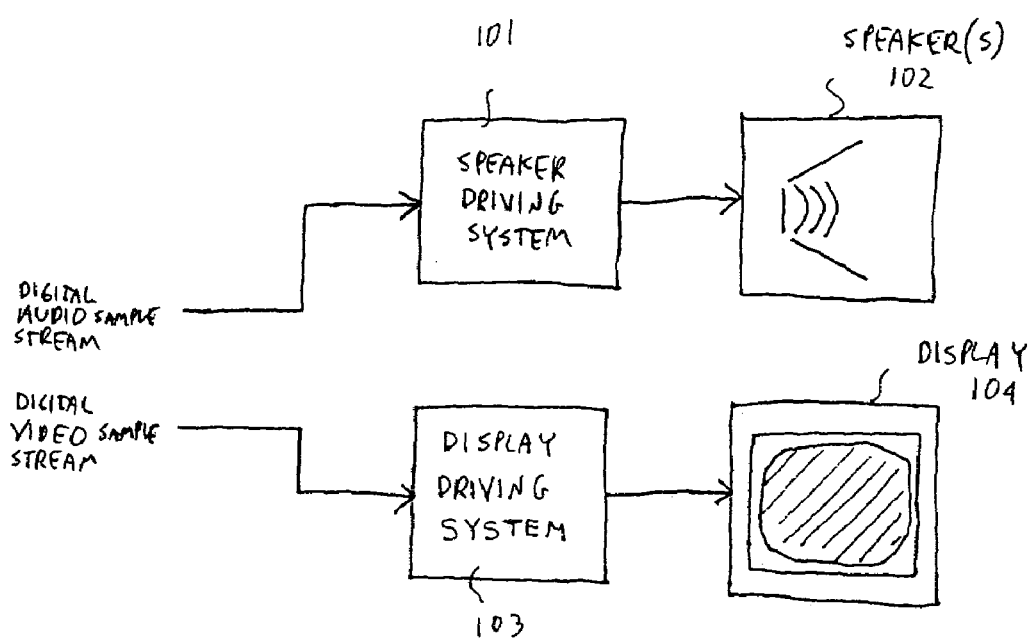
FIG. 1 (prior art) shows a system for viewing digital video while listening to its corresponding audio.
Figure 2A:
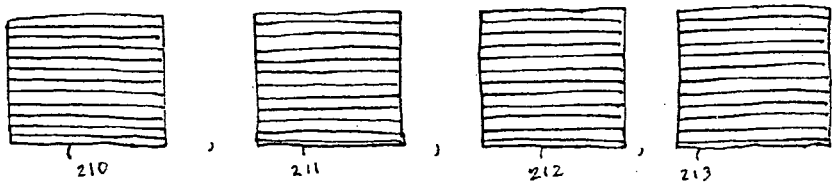
FIG. 2a (prior art) shows different video sample encoding schemes.
Figure 2B:
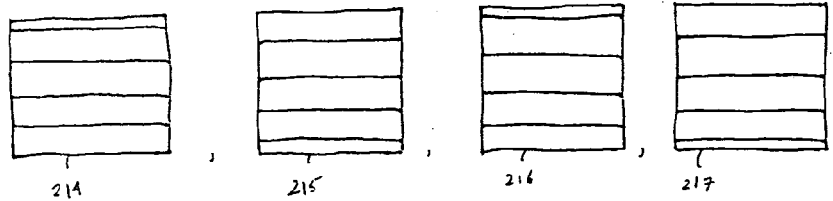
FIG. 2b (prior art) shows progressive and interlacing video streams.
Figure 2C:
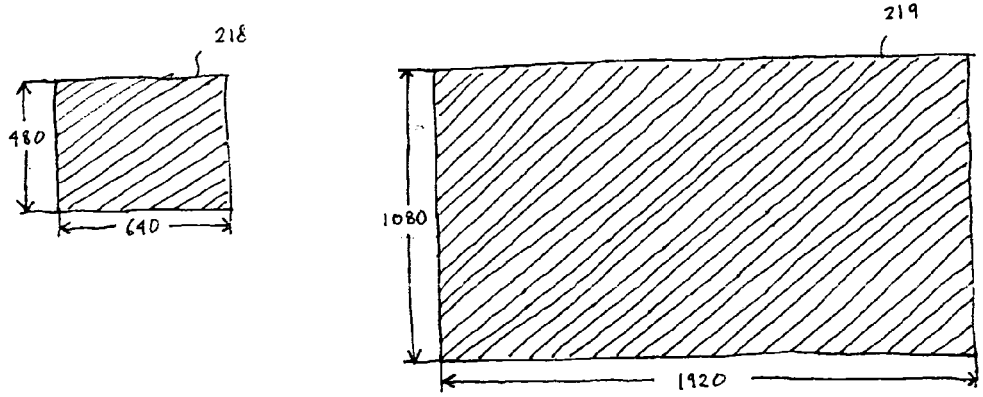
FIG. 2c (prior art) shows displays having differing pixel arrays.
Figure 3A:
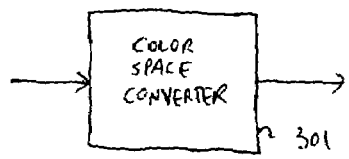
FIG. 3a (prior art) shows color space converter.
Figure 3B:
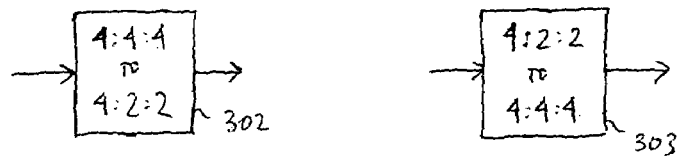
FIG. 3b (prior art) shows a pair of color difference encoding scheme converters.
Figure 3C:
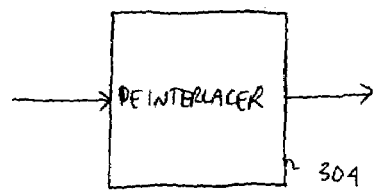
FIG. 3c (prior art) shows a deinterlacer.
Figure 3D:
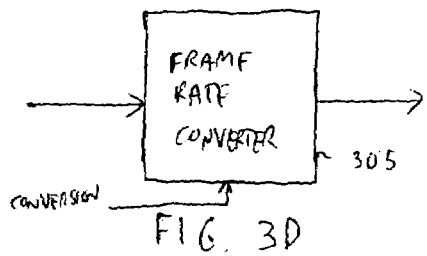
FIG. 3d (prior art) shows a frame rate converter
Figure 3E:
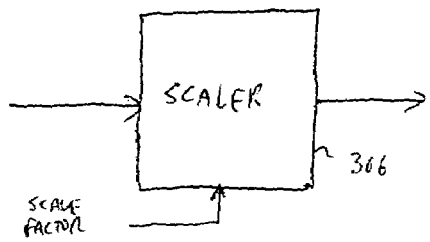
FIG. 3e (prior art) shows a scaler.
Figure 7B:
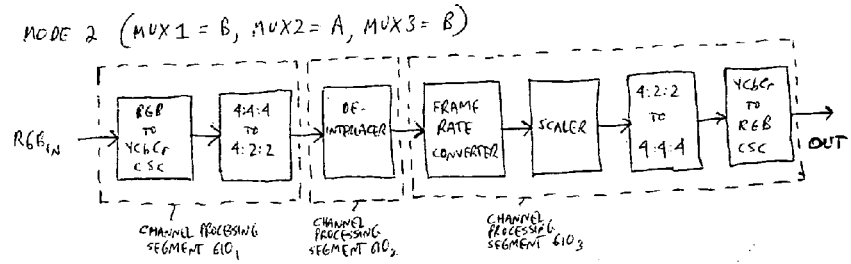

FIG. 7b corresponds to a channel that uses channel processing segments 610₁, 610₂ and 610₃ in series with each other. The circuitry and channel formations observed in FIGS. 6 and 7b through 7e are consistent with an implementation where the deinterlacer 619, frame rate converter 620 and scaler 621 are designed to operate only with 4:2:2 color difference encoded samples. Referring briefly back to FIG. 2a, note that because of the reduced sampling rate of the chroma, 4:2:2 color difference encoding 203 uses less information than 4:4:4 color difference encoding and RGB encoding. By designing the deinterlacer 619, frame rate converter 620 and scaler 621 to work with 4:2:2 color difference encoded samples, less information is required to perform the deinterlacing, frame rate conversion and scaling functions; which, in turn, corresponds to more efficient deinterlacer 619, frame rate converter 620 and scaler 621 implementations.

As such, in order to deinterlace, frame rate convert and scale an RGB encoded input sample stream, the RGB encoded input sample stream must first be converted to a 4:2:2 color difference format. The circuitry and channel formations observed in FIGS. 6 and 7b through 7e are also consistent with an implementation where the RGB to YCbCr color space converter 617 only provides 4:4:4 encoded samples and the YCbCr color space converter 622 only accepts 4:4:4 encoded samples. Channel segment 610₁ is responsible for preparing an RGB encoded input sample stream for deinterlacing and/or frame rate conversion and/or scaling by converting it into a 4:2:2 color difference encoded sample stream. As such, input 604 is run directly to the input of the channel processing segment 610₁.

FIG. 7b corresponds to a channel that is used to provide deinterlacing for an RGB encoded sample stream. As such, the 4:2:2 encoded sample stream from the output of channel processing segment 610₁ is directed to the deinterlacer 619 by the selection of channel A for multiplexer 615. Because the output 606 is to provide an output sample stream in RGB encoded form, the 4:2:2 color difference encoded output from the deinterlacer 619 needs to be converted back from 4:2:2 color difference encoding to RGB encoding. Channel processing segment 610₃ helps perform this function by way of its including a 4:2:2 to 4:4:4 color difference encoding converter 622 and YCbCr color difference to RGB color space converter 623. An output stream from the deinterlacer 619 is routed to the input of channel segment 610₃ by selecting channel B of multiplexer 616.

The circuitry and channel formations observed in FIGS. 6 and 7b through 7e are also consistent with an implementation where both the frame rate converter 620 and the scaler 621 are each capable of not providing their corresponding function (i.e., frame rate conversion and scaling, respectively) if desired. That is, each of these signal processing blocks have a "bypass" mode that allows their formatting function to not be imposed upon sample streams that are processed by signal processing segment 610₃. As such, both the frame rate converter 620 and the scaler 621 can be placed in the same channel processing segment 610₃ that performs 4:2:2 color difference to RGB conversion. Here, as an example, if the input video sample stream needs frame rate conversion the frame rate converter 620 is set with appropriate control input parameters that causes the frame rate converter to perform the desired frame rate conversion. If the input video sample stream does not need frame rate conversion, the frame rate converter 620 is set with appropriate control input parameters that causes the frame rate converter to not perform any frame rate conversion upon the sample stream. Similar operation can be effected with the scaler 621. That is, if the input video sample stream needs scaling the scaler 621 is set with appropriate control input parameters that causes the scaler to perform the desired scaling. If the input video sample stream does not need scaling, the scaler 621 is set with appropriate control input parameters that causes the scaler 621 to not perform any scaling to the sample stream. Thus, the channel of FIG. 7b can be used for RGB encoded signals that require deinterlacing and either require frame rate conversion or do not require frame rate conversion; and, either require scaling or do not require scaling. Channel B of multiplexer 614 is selected to provide the output of channel processing segment 610₃ at output 606.

Figure 7C:
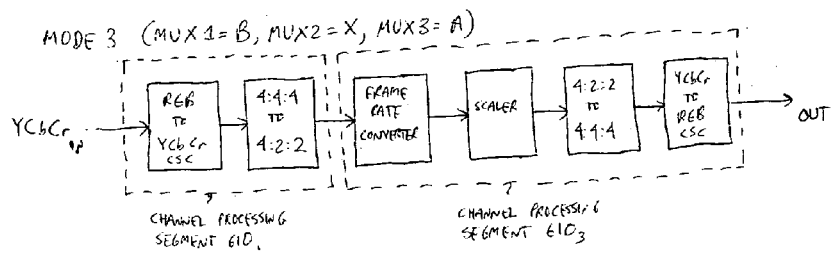

The channel of FIG. 7c can be viewed as the same as that of FIG. 7b with the exception that deinterlacing is not to be performed. Thus, keeping in mind that an RGB encoded progressive sample stream is desired at output 606, the channel of FIG. 7b is used for input sample streams that are RGB encoded and interlaced; and, the channel of FIG. 7c is used for input sample streams that are RGB encoded and progressive. These same sample steams may or may not need either or both of frame rate conversion and scaling. In order to effect the channel of FIG. 7b, multiplexer 614 is configured to select its B channel and multiplexer 616 is configured to select it's A channel.

Figure 7D:
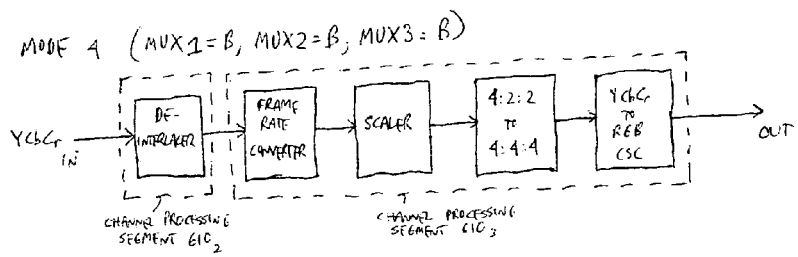
Figure 7E:
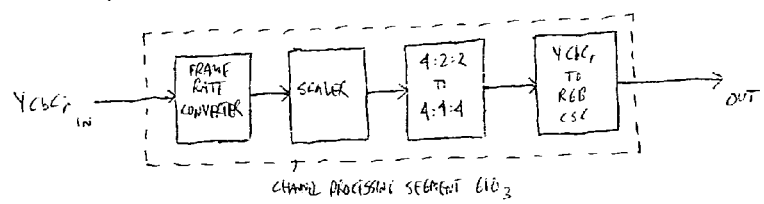

The channels of FIGS. 7a through 7c are used for RGB encoded input streams. The channels of FIGS. 7d and 7e are used for YCbCr color difference encoded input streams. The circuitry and channel formations observed in FIGS. 6, 7d and 7e are consistent with an implementation where color difference encoded input sample streams are formatted according to a 4:2:2 scheme. As a consequence, because both the deinterlacer 619, the frame rate converter 620 and the scaler 621 are assumed to operate upon 4:2:2 encoded samples, no substantive conversion is required between the color difference input 605 and the deinterlacer 619 and/or frame rate converter 620 and scaler 621. Moreover, regardless if deinterlacing or frame rate conversion or scaling is needed, 4:2:2 to 4:4:4 conversion and color difference to RGB encoding conversion is performed. Therefore channel processing segment $610_3$ is always used for input sample streams that are color difference encoded. Here, the channel of FIG. 7d is used if deinterlacing is needed (i.e., if the input sample stream is color difference encoded and interlaced); or, the channel of FIG. 7e is used if deinterlacing is not needed (i.e., if the input sample stream is color difference encoded and progressive). The channel of FIG. 7d is established by selecting channel B of multiplexer 615, channel B of multiplexer 616 and channel B of multiplexer 614. The channel of FIG. 7e is established by selecting channel C of multiplexer 616 and channel B of multiplexer 614. The circuitry and channels of FIGS. 6 and 7a through 7e can be directly applied to a conversion unit that is to provide a Digital Video Interface (DVI) compatible output. The DVI specification presently specifies an RGB encoded, progressive sample stream. The DVI specification may be currently downloaded from the following internet address http://ddwg.org/downloads.html. Here, input 604 may be used as a DVI compatible input. Moreover, the color difference encoded input 605 may be used to receive ITU-R BT.656 compatible signals (which notably use a 4:2:2 color difference encoded format). A digital to analog converter may also be coupled anywhere downstream from scaler 621 so as to provide an analog output signal that is derived from the digital sample stream. The mode input 611 is expected to be capable of expressing each state of the multi-state routing network 609. In various embodiments, the deinterlacer 619 may be capable of performing various types if deinterlacing such as: 1) motion adaptive; 2) inverse 2-3 pulldown; and, 3) inverse 2-2 pulldown. As such, the conversion unit is capable of not only converting purely interlaced sample streams; but also, can convert sample streams that are in 2-3 pulldown or 2-2 pulldown format. The type input 612 can be viewed as a form of control input that is provided to the deinterlacer for the purpose of selecting different deinterlacing modes. The type input 612 may be provided by the control function. In an alternative embodiment, the deinterlacer determines what type of deinterlacing needs to be performed and reports this information to the control function. In this case, a type input 612 may not be needed.

The conversion input 624 is used to set the frame rate conversion that is performed by the frame rate conversion unit. The scale factor input 613 is used to set the scaling that is performed by the scaler 621. In an embodiment, the frame rate converter 620 and/or the scalar 621 are respectively told what frame rate conversion and/or scaling is to be performed by the control function. In a further embodiment, an end user having knowledge of the display upon which the output sample stream is to be displayed informs the control function of the frame rate and/or pixel array dimensions of the display. From this information, appropriate input parameters can be provided to the frame rate converter 620 and/or scaler 621.

It is important to point out that, at the expense of multi-state routing network complexity, alternate embodiments may be readily constructed having more channel processing segments with fewer signal processing blocks for purposes of supporting an even greater collection of possible channels between the conversion unit's video input(s) and output. For example, the 4:2:2 to 4:4:4 converter 622 and YCbCr to RGB color space coverter 623 could be associated with a fourth channel processing segment so as to leave channel processing segment $610_3$ with only a frame rate converter 620 and scalar 621. In this case, by routing the output of scaler 621 into another input channel of multiplexer 614 and by keeping the output of color space converter 623 routed to an input channel of multiplexer 614, the output 606 would be capable of provided not only RGB encoded outputs but also YCbCr encoded outputs. As such, the conversion unit would be capable of providing de-interlacing, frame rate conversion and/or scaling for: 1) an RGB to YCbCr input/output conversion process; or, 2) a YCbCr to RGB input/output conversion process. In this case, the multi-state routing network 609 would need to be further redesigned (other than the changes to the input of multiplexer 614 described just above) to further allow for the output of the scaler 621 to be routed to the input of the 4:2:2 to 4:4:4 converter 622. Further still, the multi-state routing network 609 could be designed to route those input streams not requiring either of frame rate conversion and scaling to bypass channel segment $610_3$ altogether.

Figure 8A:
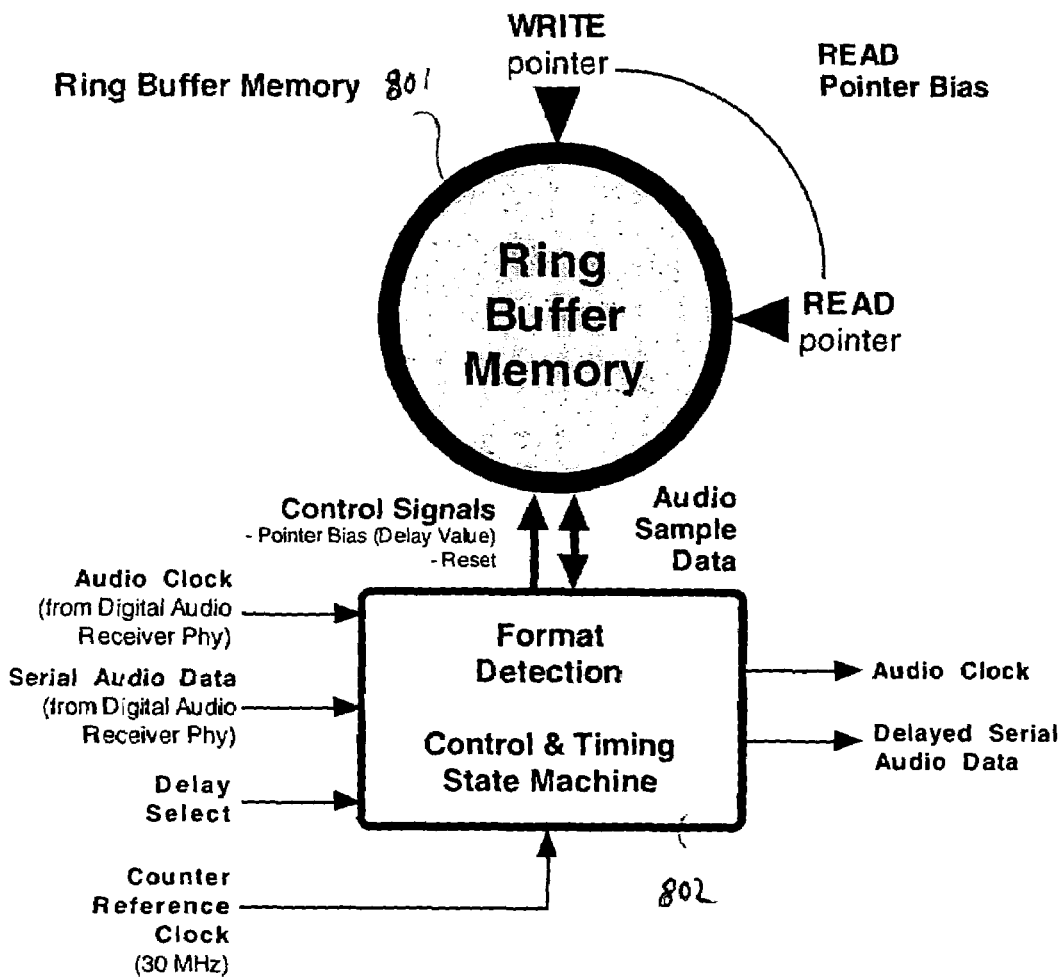
FIG. 8a shows an embodiment of an audio sample delay unit.
Figure 8B:
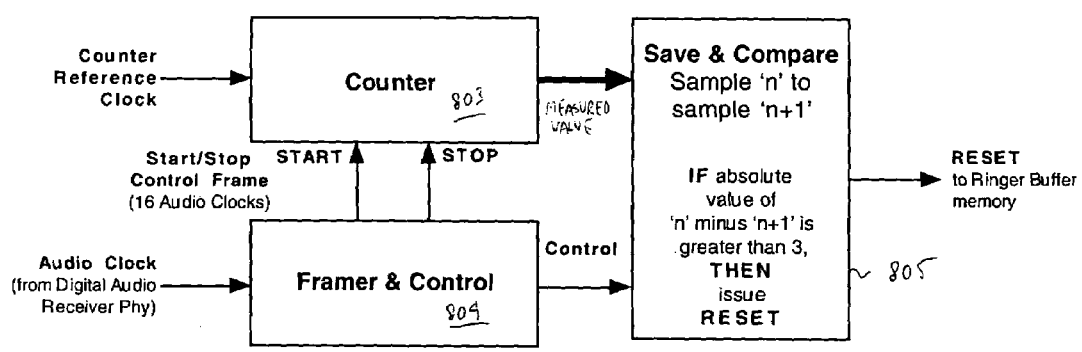
FIG. 8b shows an embodiment of an audio clock frequency change circuit.

Referring back to FIG. 5, the delay unit 508 is programmed to provide a delay to the audio samples based upon the specific channel arrangement and processing that the conversion unit is to apply to the input video sample stream. In an embodiment, the delay is based upon the propagation delay imparted by each functional block along the established channel. FIGS. 8a and 8b relate to an embodiment of an audio delay unit 508 implementation.

According to the approach of FIG. 8a, the audio delay unit includes a ring buffer memory 801 controlled by logic circuitry 802. The amount of memory space used for the ring buffer memory 801 is sufficient to provide the greatest amount of audio delay (which, in turn, corresponds to the greatest amount of video processing delay) for both the longest audio sample word length and the highest audio sample rate to be accommodated. In an embodiment, the greatest video processing delay to be accommodated is 110 milliseconds, the longest audio sample word length is 24 bits, and the highest audio sample rate is 96K samples per second (sps). In a further embodiment the audio delay unit is designed to also be capable of adapting to common word lengths between 16 and 24 bits, and common rates between 44K sps and 96K sps, while providing delay capability that is adjustable in 1 millisecond (ms) increments, between 0 ms and 110 ms.

The audio delay function works by writing data into the ring buffer 801. There are read and write pointers into the buffer, and the difference between these pointers determines the delay (e.g., as specified at the "delay select" input). A specific amount of delay will produce a fixed difference between the read and write pointers for a given audio format. However, if the audio format is changed, and this results in the storage requirements changing (e.g., a different amount of memory will be required to store 10 ms worth of data (for a 10 ms delay) for a 16 bit 48 kHz audio sample stream as compared to a 24 bit 96 kHz audio sample stream), then the difference between the read and write pointers must change as well since there will now be a different amount of memory required to store the duration of audio data.

FIG. 8b shows an embodiment of audio sample rate change detection function that can be designed into the logic circuitry 802 of FIG. 8b. Audio sample rate change detection is useful in that it can be used to detect a change in the audio sample format. The audio sample rate change detection function includes a sample rate counter (frequency counter) 803, framing and control logic 804, and save and comparison circuitry

805. The sample rate counter 803 receives a reference clock having a substantially greater frequency (e.g., 30 MHz) than the audio sample clock frequency (the "audio clock"). In an embodiment, the audio clock is provided with the audio samples themselves and can be used to establish the word size of the audio samples.

The framer and control unit provides "start" and "stop" commands to the frequency counter 803 for every fixed number of passing audio clock cycles (e.g., 16). The frequency counter therefore "measures" the time length (in units of the reference clock cycle time) of a fixed number of audio samples. The save and comparison circuitry 805 saves consecutive measurement results as determined and provided by the frequency counter 803. In an embodiment where the reference clock frequency is 30 MHz, the framer 804 provides start and stop signals across 16 audio clock cycles, and the audio clock rates can be any of (in MHz) 1.0240, 1.2800, 1.4112, 1.5360, 1.7640, 1.9200, 2.0480, 2.1168, 2.3040, 2,8224, 3.0720, 3.5280, 3.8400, 4.2336, 4.6080, 5,6448, and 6.1440; then, an audio clock frequency change will occur anytime the counter's measurements are different by more than three (the absolute value of two subsequent samples subtracted one from another is greater than 3). As a consequence, a reset control signal is issued to reinitialize (set to zero) the contents of the ring buffer memory and restart the delay process.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behaviorial level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any statutory mechanism for storing information in a form readable by a machine (e.g., a computer). For example, a machine readable medium includes read only memory (ROM); random access memory (RAM); magnetic disk storage media; optical storage media; flash memory devices.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus capable of establishing different video sample stream processing channels between a plurality of video sample stream inputs and a video sample stream output, said apparatus comprising:
   a multi-state routing network comprising wiring to route a video sample stream, said multi-state routing network comprising:
   a) outputs that are coupled to the inputs of a plurality of video sample stream channel processing segments, each channel processing segment comprising at least one signal processing block;
   b) inputs that are coupled to the outputs of said video sample stream channel processing segments;
   c) said video sample stream inputs; and,
   d) said video sample stream output.

2. The apparatus of claim 1 wherein one of said signal processing blocks is one or more of a deinterlacer and a frame rate converter.

3. The apparatus of claim 1 wherein one of said signal processing blocks is one or more of a scaler and a color space converter.

4. The apparatus of claim 3 wherein said color space converter is one or more of a color difference to trichromatic color space converter and a trichromatic to color difference color space converter.

5. The apparatus of claim 4 wherein said color difference to trichromatic color space converter is a color difference to RGB color space converter.

6. The apparatus of claim 4 wherein said trichromatic to color difference color space converter is an RGB to color space converter.

7. The apparatus of claim 1 wherein one of said signal processing blocks is one or more of a 4:4:4 to 4:2:2 color difference converter and a 4:2:2 to 4:4:4 color difference converter.

8. A method, comprising:
   a) routing a first digital video sample stream having a first format through a first channel processing segment, said first channel processing segment selected from amongst a plurality of channel processing segments;
   b) routing a second digital video sample stream having a second format through a second channel processing segment, said second channel processing segment selected from amongst said plurality of channel processing segments; and,
   c) routing a third digital video sample stream having a third format through said first and second channel processing segments, said first and second channel processing segments selected from amongst said plurality of channel processing segments.

9. The method of claim 8 further comprising one or more of changing the state of a multi-state wiring network between a) and b) and changing the state of said multi-state wiring network between b) and c).

10. The method of claim 8 further comprising deinterlacing said first digital video sample stream with said first channel processing segment.

11. The method of claim 10 further comprising scaling said second digital video sample stream with said second channel processing segment.

12. The method of claim 11 further comprising deinterlacing said third digital video sample stream with said first channel processing segment and scaling said third digital video sample stream with said second channel processing segment.

13. The method of claim 10 further comprising performing frame rate conversion on said second digital video sample stream with said second channel processing segment.

14. The method of claim 13 further comprising deinterlacing said third digital video sample stream with said first channel processing segment and performing frame rate conversion on said third digital video sample stream with said second channel processing segment.

15. The method of claim 14 further comprising scaling said third digital video sample stream with said second channel processing segment.

16. The method of claim 10 wherein said first digital video sample streams is in a color difference format during said deinterlacing.

17. An apparatus, comprising:
a digital video sample stream conversion unit to establish any of a plurality of different digital video sample stream processing channels, said digital video sample stream conversion unit comprising:
   a) a first channel processing segment to perform color space conversion, said first channel processing segment comprising a color space converter;
   b) a second channel processing segment to perform deinterlacing, said second channel processing segment comprising a deinterlacer;
   c) a third channel processing segment to perform scaling, said third channel processing segment comprising a scaler; and,
   d) a multi-state routing network on a semiconductor chip comprising multiplexers implemented with logic circuitry and wiring, said multi-state routing network having outputs coupled to inputs of said channel processing segments, said multi-state routing network having inputs coupled to outputs of said channel processing segments.

18. The apparatus of claim 17 further comprising a control function coupled to said multi-state routing network with dedicated control lines to set said multi-state network in any one of a plurality of states, each one of said states corresponding to a different one of said digital video sample stream processing channels.

19. The apparatus of claim 18 further comprising a control function coupled to said multi-state routing network with a bus to set said multi-state network in any one of a plurality of states, each one of said states corresponding to a different one of said digital video sample stream processing channels.

20. The apparatus of claim 17 wherein said multi-state routing network comprises a first digital video sample stream input, a second digital video sample stream input and a digital video sample stream output.

21. The apparatus of claim 20 where said digital video sample stream output is coupled to an output of one of said multiplexers.

22. The apparatus of claim 21 wherein said one of said multiplexers has an input channel coupled to a channel processing segment output.

23. The apparatus of claim 20 wherein one of said multiplexers has an output coupled to a multi-state routing network output, said multi-state routing network output also coupled to an input of said second channel processing segment.

24. The apparatus of claim 23 wherein another one of said multiplexers has an input coupled to a multi-state routing network input, said multi-state routing network also coupled to an output of said second channel processing segment.

25. A machine readable medium having stored thereon a description of semiconductor chip circuit design, said semiconductor chip circuit design comprising a description of:
a digital video sample stream conversion unit to establish any of a plurality of different digital video sample stream processing channels, said digital video sample stream conversion unit comprising:
   a) a first channel processing segment comprising logic circuitry to perform color space conversion;
   b) a second channel processing segment comprising logic circuitry to perform deinterlacing;
   c) a third channel processing segment comprising logic circuitry to perform scaling; and,
   d) a multi-state routing network comprising multiplexers and wiring, said multi-state routing network having outputs coupled to inputs of said channel processing segments, said multi-state routing network having inputs coupled to outputs of said channel processing segments.

* * * * *